United States Patent [19]

Hicks

[11] Patent Number: 4,750,841
[45] Date of Patent: Jun. 14, 1988

[54] BARREL SUPPORT

[75] Inventor: Scott P. Hicks, Harrisburg, Pa.

[73] Assignee: Graham Engineering Corp., York, Pa.

[21] Appl. No.: 90,048

[22] Filed: Aug. 27, 1987

[51] Int. Cl.⁴ .............................................. A21C 1/06
[52] U.S. Cl. .............................. 366/79; 248/DIG. 1; 425/376.1
[58] Field of Search ............... 425/190, 466, 367 R, 425/200; 248/DIG. 1; 366/79, 69, 349

[56] References Cited

U.S. PATENT DOCUMENTS

| | | | |
|---|---|---|---|
| 2,539,783 | 1/1951 | Kirk | 248/62 |
| 3,039,341 | 6/1962 | Stieglitz | 82/38 |
| 3,128,073 | 4/1964 | Berlyn | 248/55 |
| 3,167,292 | 1/1965 | Meyerowitz | 248/230 |
| 3,391,051 | 7/1968 | Ehrenfreund et al. | 161/164 |
| 3,609,932 | 10/1971 | Pirro | 52/27 |
| 3,802,655 | 4/1974 | Schuplin | 248/74 |
| 3,851,979 | 12/1974 | Becker | 403/76 |
| 4,004,766 | 1/1977 | Long | 248/55 |
| 4,615,664 | 10/1986 | Kolossow | 425/4 |
| 4,679,755 | 7/1987 | Marsault | 248/DIG. 1 |

FOREIGN PATENT DOCUMENTS 794571  5/1958  United Kingdom ......... 248/DIG. 1

Primary Examiner—Bernard Nozick
Attorney, Agent, or Firm—Thomas Hooker

[57] ABSTRACT

A support for the discharge end of the barrel of a rotary extrusion machine includes a body having a two-armed cradle for receiving the barrel and a cover extending across the tops of the cardle arms defining an interior barrel-receiving opening. Three leaf springs extend around the interior circumference of the opening with an adjustable barrel-engaging set screw located in the center of each leaf spring. The leaf springs compensate for radial thermal expansion and contraction of the barrel held in the support.

5 Claims, 1 Drawing Sheet

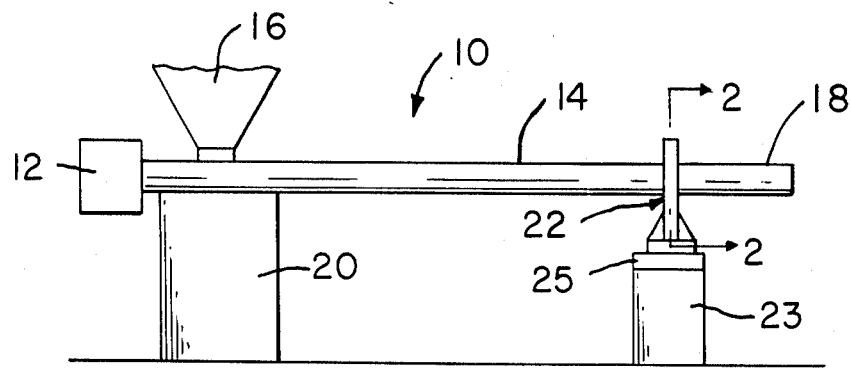
FIG. 1
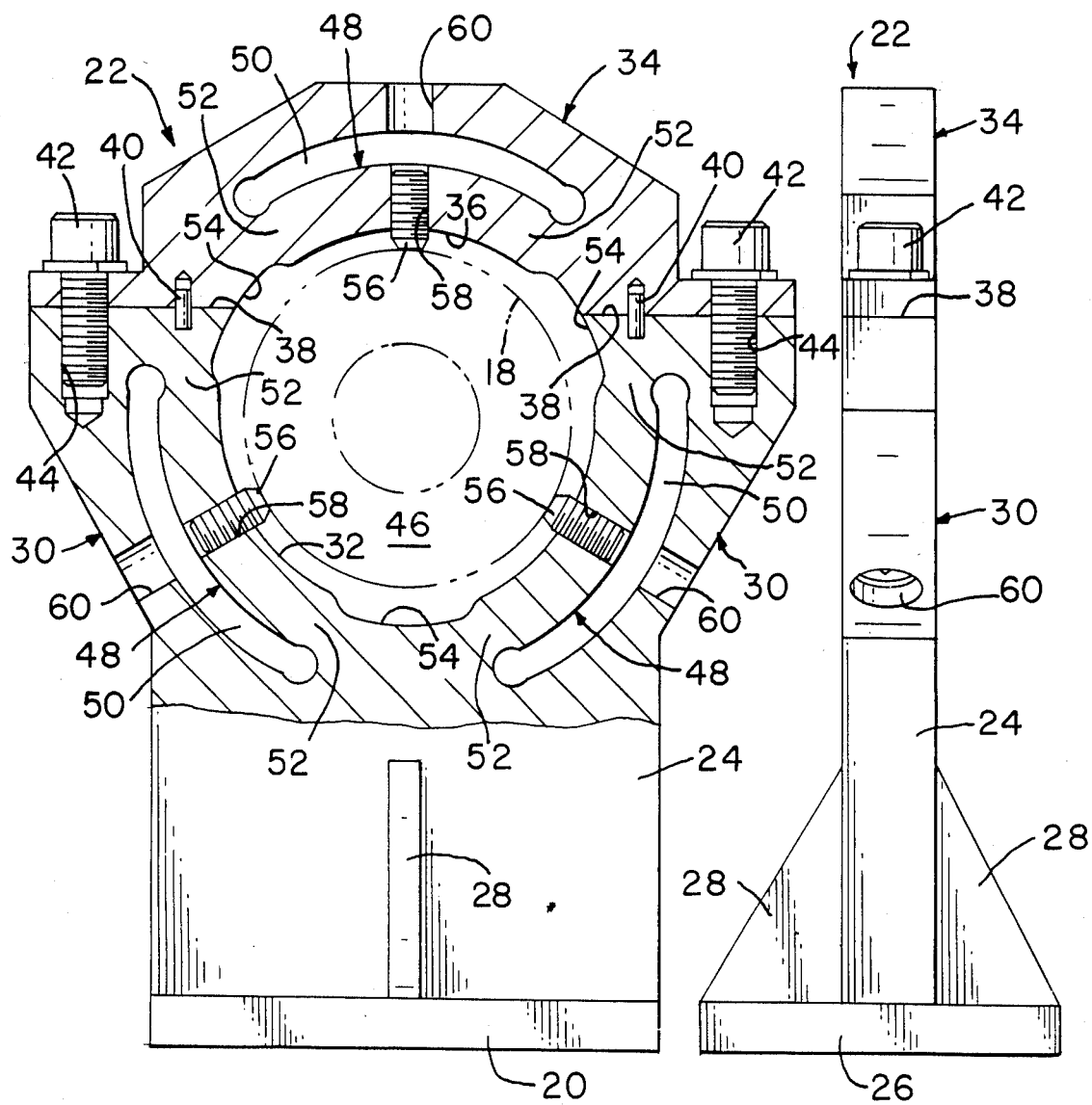
FIG. 2
FIG. 3

BARREL SUPPORT

The invention relates to an improved support for a rotary extrusion machine barrel.

The barrel of a rotary extrusion machine surrounds an auger-shaped extrusion screw. The screw rotates and carries pellets of plastic material through the length of the barrel to heat and compress the pellets thereby forming a high pressure, high temperature flow of molten plastic material. Heating and cooling devices are attached to the barrel in order to maintain proper operating temperatures. The discharge end of the barrel is maintained at a high working temperature which may be 400 degrees F. or, in some instances, an even higher.

In order for the extrusion machine to function properly it is necessary that the barrel is carefully aligned. This alignment must be maintained when the tube is shut down and cools to ambient temperatures of about 70 degrees F. and when the barrel is heated to a high working temperature. Alignment of extrusion machine barrels is achieved prior to insertion of the screw by use of a high accuracy optical instrument similar to a surveyor's precision transit.

The high temperature discharge end of the barrel expands radially when heated and contracts radially when cooled. The amount of radial expansion and contraction depends upon the diameter of the barrel. In barrels having a diameter of approximately eight inches, radial thermal expansion may be greater than 0.01 inch. In order for the extrusion screw to maintain proper position within the barrel it is necessary that this expansion and retraction occur without axial shifting or distortion of the barrel. Shifting or distortion of the barrel through a distance of this order of magnitude destroys the proper alignment.

The support for the discharge end of an extrusion barrel must hold the considerable weight of the barrel and attached components, including heating and cooling equipment, permit alignment of the barrel, and also automatically compensate for radial temperature expansion and contraction of the barrel while maintaining alignment and distorting the barrel. U.S. Pat. No. 3,128,073 discloses a conventional non-adjustable barrel support where the barrel is supported by four machined large area contact surfaces and the bore is temperature compensated but in which it is impossible to adjust the barrel.

The invention is an improved barrel support including a cradle having two leaf springs extending along the interior of the cradle arms so that a barrel fitted in the cradle engages set screws in the centers of the leaf springs. A cover bolted to the ends of the cradle arms carries a third leaf spring and set screw. Adjustment of the set screws permits very accurate and permanent bore sighting of the barrel. Reduced width pivot points at the ends of the springs facilitate outward and inward flexing of the springs to accommodate radial expansion and contraction.

Other objects and features of the invention will become apparent as the description proceeds, especially when taken in conjunction with the accompanying drawings illustrating the invention, of which there is one sheet and one embodiment.

IN THE DRAWINGS

FIG. 1 is a side view of a rotary extrusion machine including a tube support for the discharge end of the barrel;

FIG. 2 is an enlarged sectional view taken along line 2—2 of FIG. 1; and

FIG. 3 is a side view of FIG. 2.

Rotary extrusion machine 10 includes a drive motor 12 attached to one end of extrusion barrel 14. The motor rotates a auger-shaped screw fitted within the barrel so that pellets of plastic fall from hopper 16 into the barrel and are rotated, heated and compressed as they move along the barrel. Rotation of the screw delivers hot, pressurized and molten plastic from extrusion end 18 located away from the hopper end. The heating and cooling devices conventionally attached to barrel 14 are omitted in FIG. 1.

The hopper end of machine 10 is mounted on a fixed support 20. The extrusion end of the barrel is surrounded by a barrel support 22 which in turn is mounted on a fixed table 23. Conventional longitudinal bearing 25 accommodates longitudinal expansion and contraction of barrel 14.

Barrel support 22 includes a uniform thickness steel body 24 with flat base 26 secured to the body by welds and gussets 28. At the upper part of body 24 a pair of spaced arms 30 define cradle recess 32 for receiving barrel 18. Cradle cover 34 extends across the top of arms 30 and includes a shallow recess 36 cooperating with cradle recess 32 to form a cylindrical opening 46 slightly larger than the barrel.

Cover 34 rests flush on the flat co-planear ends 38 of arms 30 and is maintained in proper alignment by guide pins 40. Bolts 42 extend freely through bores at the ends of cover 34 and threadably engage complementary bores 44 formed in the upper end of arms 30.

The cradle recess 32 and shallow recess 36 cooperate to define a central opening 46 surrounding the barrel 18. Three like leaf compensation springs 48 are spaced around the circumference of opening 46 with one spring 48 extending along each cradle arm 30 and one spring extending along the cover 34. Each compensation spring extends approximately 75 degrees around the opening 46. Slots 50 are formed through the thickness of the arms and cover radially outwardly of springs 48. Each slot extends circumferentially around the recess along the length of its adjacent spring so that the springs have a square radial cross-section. The radial width of the ends of springs 48 is reduced on both spring sides at pivot points 52 to facilitate bending of the springs relative to the rigid, non-flexible surrounding parts of the body and cover. Reduction in width of the ends of the springs 52 is achieved by providing a shallow valley 54 in opening 32 between the ends of adjacent springs and by increasing the width of slots 50 at the spring ends. The valleys 54 at the ends of the spring in cover 34 extend across the interface between the cover and arms 30.

Set screws 56 are threadably seated in radial bores 58 extending through the centers of spring arms 48. Oversized bores 60 in the arms and cover are aligned with bores 58 to permit insertion and rotation of the set screws.

During set up of rotary extrusion machine 10 the hopper end of the machine is mounted on base 20. Cover 34 is removed from the body to permit the extrusion end of barrel 18 to be seated in the opening 46 to rest on the two set screws 56 in arms 30. The cover is then replaced and bolts 42 are tightened to secure the cover in place. The set screws 56 are then rotated in their respective springs 48 during sighting in of the barrel so that the extrusion end of the barrel is precisely aligned relative to the fixed hopper end. The alignment process includes tightening the set screws to a relatively high torque in order to prestress springs 48 and hold the tube in a known, accurately aligned position. In some cases, the torque may be as great as 400 inch-pounds. Alignment of the barrel in support 22 is performed at ambient temperature.

Barrel support 22 holds the extrusion end of the barrel 14 in the desired alignment both at ambient temperatures and higher operating temperatures which may be as great as 400 degrees F. During operation of machine 10 the extrusion end of the barrel is heated and expands radially, thereby outwardly flexing leaf springs 48 about fixed ends 52. The three point suspension of the barrel in support 22 provides an individual and separate spring for each of the three set screw contacts so that adjustment of one set screw and stressing of the corresponding spring does not directly move the other set screws, although the other springs may be stressed by responsive movement of the barrel. The independence of the set screws facilitates rapid and accurate alignment of the barrel.

While I have illustrated and described a preferred embodiment of my invention, it is understood that this is capable of modification, and I therefore do not wish to be limited to the precise details set forth, but desire to avail myself of such changes and alterations as fall within the purview of the following claims.

What I claim as my invention is:

1. A support for the extrusion end of a rotary extrusion machine barrel, the support including a body and a cover with the body adapted to be mounted on a fixed support, the body including two cradle arms defining a recess for receiving the extrusion end of a barrel and the cover extending across the ends of the arms at the top of the cradle recess to define an interior opening, bolts securing ends of the cover to the ends of the cradle arms to close such interior opening, three like leaf springs spaced around the interior circumference of the opening, two of said leaf springs extending along the cradle arms and one leaf spring extending along the cover, reduced cross sectional pivot points at the ends of the springs, slots formed in the cradle arms behind each spring and a slot formed in the cover behind the cover spring, said slots extending along the springs between the pivot points, radial bores extending through the center of each spring and through the body or cover outwardly of the spring, and three set screws threadably engaged in the inner ends of said bores and being spaced approximately 120 degrees apart around the circumference of the interior opening whereby the set screws are threadably adjustable to support the barrel in a proper, aligned position and said springs flex in response to temperature expansion of the barrel without disturbing the alignment of the barrel.

2. A support as in claim 1 wherein the interior wall of said interior opening includes three shallow valleys located between the ends of said springs.

3. A support as in claim 1 wherein two valleys extend past the interfaces between the cover and the cradle arms.

4. A support as in claim 1 wherein said springs are rectangular in radial cross section.

5. A support as in claim 4 wherein said springs each extend approximately 75 degrees around the circumference of the opening.

* * * * *